United States Patent [19]

Sakamoto

[11] Patent Number: 4,590,537

[45] Date of Patent: May 20, 1986

[54] LAMINATED CAPACITOR OF FEED-THROUGH TYPE

[75] Inventor: Yukio Sakamoto, Fukui, Japan

[73] Assignee: Murata Manufacturing Co., Ltd., Japan

[21] Appl. No.: 647,646

[22] Filed: Sep. 6, 1984

[30] Foreign Application Priority Data

Sep. 11, 1983 [JP]  Japan .......................... 58-140846[U]

[51] Int. Cl.⁴ .............................................. H01G 1/14
[52] U.S. Cl. .................................................. 361/306
[58] Field of Search .............. 361/402, 404, 405, 306, 361/308, 309, 310, 304, 321 C, 433 C

[56] References Cited

U.S. PATENT DOCUMENTS

| | | | |
|---|---|---|---|
| 3,444,436 | 5/1969 | Coda | 361/405 |
| 4,193,106 | 3/1980 | Coleman | 361/321 C X |
| 4,356,529 | 10/1982 | Kopel | 361/304 |
| 4,424,552 | 1/1984 | Marcoux | 361/306 |

*Primary Examiner*—Donald A. Griffin
*Attorney, Agent, or Firm*—Ostrolenk, Faber, Gerb & Soffen

[57] ABSTRACT

A laminated capacitor of a feed-through type includes a plurality of first and second type dielectric sheets. The first type dielectric sheet has a center electrode deposited on a front surface thereof, a first extending electrode extending from the center electrode and terminating at a particular side of the first type dielectric sheet, and a second extending electrode extending from the center electrode and terminating at the same particular side of the first type dielectric sheet in a spaced relationship with the first extending electrode. The second type dielectric sheet has a center electrode deposited on a front surface thereof, and a third extending electrode extending from the center electrode and terminating at a particular side of the second type dielectric sheet. The first and second type dielectric sheets are laminated alternately such that the front surface of the first type dielectric sheet confronts a back surface of the second type dielectric sheet and the front surface of the second type dielectric sheet confronts a back surface of the first type dielectric sheet, and such that the particular sides of the first type dielectric sheets and the particular sides of the second type dielectric sheets are aligned to define a plane surface. First, second and third external electrodes are provided on the plane surface to connect the first, second and third extending electrodes, respectively.

6 Claims, 6 Drawing Figures

LAMINATED CAPACITOR OF FEED-THROUGH TYPE

BACKGROUND OF THE INVENTION

1. Field of the invention

The present invention relates to a laminated capacitor and, more particularly, to an arrangement of a laminated capacitor of a feed-through type.

2. Description of the Prior Art

Conventionally, many types of feed-through capacitors are proposed for eliminating or reducing unwanted high frequency noise signals. Such feed-through capacitors are so designed that they can be easily mounted on a chassis without any difficulty, but they are not suitable for being mounted on a circuit board.

To facilitate the mounting of a capacitor on a circuit board, a chip shaped feed-through type laminated capacitor 1, such as shown in FIG. 1, has been proposed. According to the laminated capacitor 1 shown in FIG. 1, first type dielectric sheets 2 and second type dielectric sheets 3 are laminated alternately, and another dieletric sheet 11 is further laminated. Then, external electrodes 4, 5 and 6 are provided so as to enable the mounting of the capacitor on a circuit board. FIG. 2 shows a manner in which dielectric sheets 2 and 3 are arranged. Dielectric sheet 2 has a rectangular configuration defined by four sides 7a, 7b, 7c and 7d and is provided with a stripe shaped electrode 8 extending between sides 7a and 7b for receiving or producing signals. Similarly, dielectric sheet 3 has a rectangular configuration defined by four sides 9a, 9b, 9c and 9d and is provided with a stripe shaped electrode 10 extending between sides 9c and 9d for grounding. Dielectric sheets 2 and 3 has exactly the same configuration. When they are laminated one over the other in a manner shown by chain lines in FIG. 2, electrodes 8 and 10 cross each other at a right angle. Accordingly, a part of electrode 8 confronts a part of electrode 10.

In the above described manner, a plurality of dielectric sheets 2 and 3 are laminated one over the other and, at the end, dielectric sheet 11, which has no electrode deposited thereon, is laminated, thereby defining a laminated block. It is to be noted that electrodes 8 on dielectric sheets 2 are all aligned in the first direction, and electrodes 10 on dielectric sheets 3 are all aligned in the second direction, which is at a right angle to the first direction. Then, external electrodes 4 and 5 are provided at opposite ends of laminated block so that external electrodes 4 and 5 are connected to electrode 8. Furthermore, external electrode 6 is provided intermediately between external electrodes 4 and 5 so that external electrode 6 is connected to electrode 10. Electrodes 4, 5 and 6 must be so extended to a surface of the laminated block, on which the circuit board confronts.

According to the prior art laminated capacitor of a feed-through type, the ends of electrodes 8 appear on opposite faces containing sides 7a, 9a and sides 7b and 9b, respectively. Furthermore, the ends of electrodes 10 appear on different opposite faces containing sides 7c, 9c and sides 7d and 9d, respectively. Accordingly, the face for providing external electrode 4 or 5 for the connection with electrode 8 is not flush with the face for providing external electrode 6 for the connection with electrode 10. Thus, in order to enable the electric connection of external electrodes 4, 5 and 6 to the electrode arrangement on a circuit board, it is necessary to extend the external electrodes 4, 5 and 6 around the edges so that they are contained in the same plane surface. To this end, according to the prior art laminated capacitor of FIG. 1, external electrodes 4 and 5 are prepared in a shape of a cap, and external electrode 6 is prepared in a belt that extends around the laminated block.

The prior art laminated capacitor has such disadvantages that it requires difficult steps before the external electrodes 4, 5 and 6 are completed, resulting in a high manufacturing cost. Furthermore, since external electrodes 4, 5 and 6 extend around an edge, e.g, 14, external electrodes 4, 5 and 6 might be undesirably cut at such an edge 14. Moreover, since the distance of the electrode between, e.g., electrode 10 and the electrode on the circuit board becomes relatively long, the residual inductance also becomes large, resulting in the deterioration of the capacitor characteristics.

SUMMARY OF THE INVENTION

The present invention has been developed with a view to substantially solving the above described disadvantages and has for one object to provide an improved laminated capacitor of a feed-through type in which the external electrodes can provided through simple and easy steps, thereby resulting in a low manufacturing cost.

It is also an object of the present invention to provide a laminated capacitor of a feed-through type of the above described type which has external electrodes that do not extend around edges, thereby preventing undesirable cuts of the external electrodes.

In accomplishing these and other objects, a laminated capacitor of a feed-through type according to the present invention comprises, a plurality of dielectric sheets laminated one over the other defining a laminated block having at least one plane surface where the sides of the laminated sheets are aligned, a plurality of center electrodes, each provided between neighboring dielectric sheets such that the rim of the center electrode is spaced from the rim of the sheet, a first extending electrode extending from each of every other center electrodes and terminating at the plane surface, a second extending electrode extending from each of the same center electrodes as those provided with the first extending electrodes, and terminating at the plane surface, a third extending electrode extending from each of the remaining center electrodes and terminating at the plane surface, a first external electrode provided on the plane surface and electrically connected to the first extending electrodes, a second external electrode provided on the plane surface and electrically connected to the second extending electrodes, and a third external electrode provided on the plane surface and electrically connected to the third extending electrodes.

BRIEF DESCRIPTION OF THE DRAWINGS

These and other objects and features of the present invention will become apparent from the following description of preferred embodiments thereof with reference to the accompanying drawings, throughout which like parts are designated by like reference numerals, and in which.

DESCRIPTION OF PREFERRED EMBODIMENTS

Figure 1:
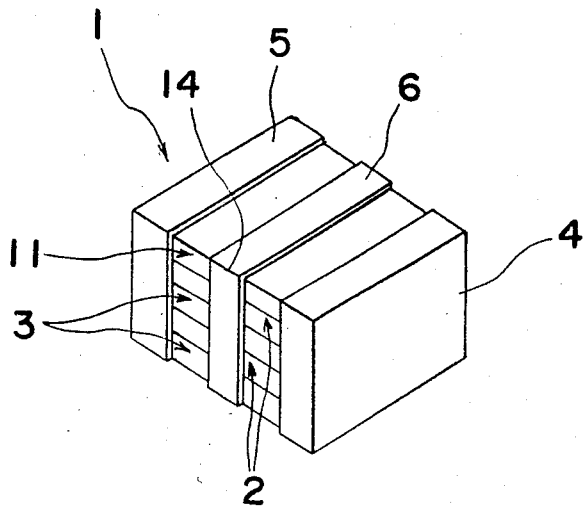
FIG. 1 is a perspective view of a laminated capacitor of a feed-through type according to the prior art.
Figure 2:
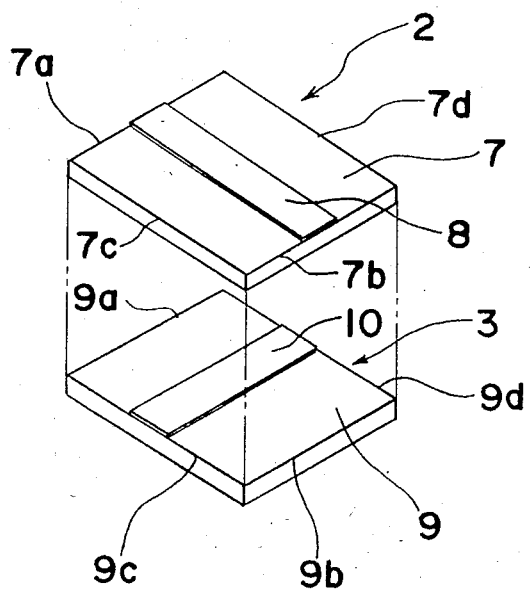
FIG. 2 is a perspective view of certain sheets provided in the capacitor of FIG. 1.
Figure 3:
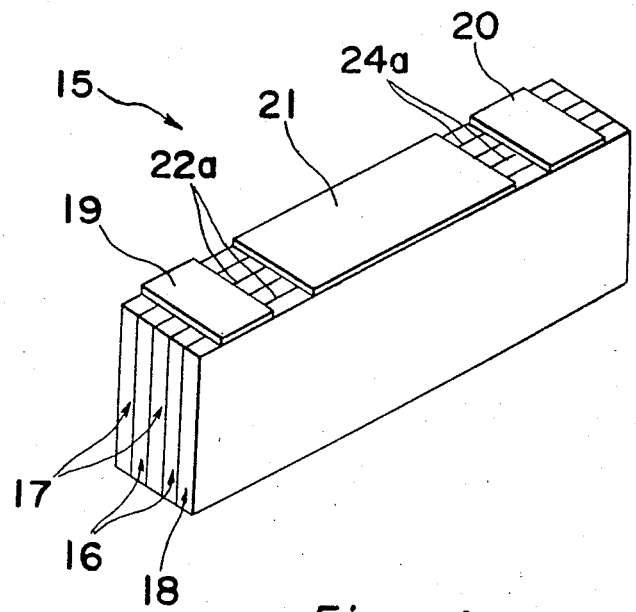
FIG. 3 is a perspective view of a laminated capacitor of a feed-through type according to a first embodiment of the present invention.

Referring to FIG. 3, a laminated capacitor 15 of a feed-through type according to a first embodiment of the present invention is shown. Laminated capacitor 15 includes first type dielectric sheets 16, second type dielectric sheets 17 and another dielectric sheet 18.

Figure 4:
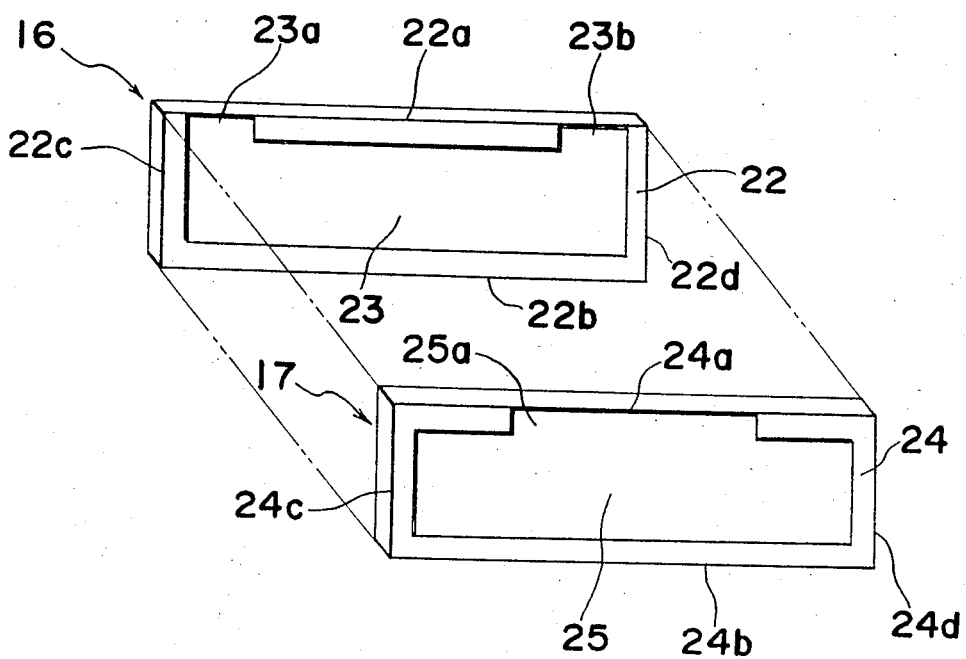
FIG. 4 is a perspective view of different sheets provided in the capacitor of FIG. 3.

Referring to FIG. 4, the first type dielectric sheet 16 is defined by a rectangular dielectric plate 22 having four sides 22a, 22b, 22c and 22d. An electrode 23 formed by a film of electric conductive material is deposited on one surface, referred to as a front surface, of dielectric plate 22. Electrode 23 has a pair of extending portions 23a and 23b, which extend to opposite end portions of the same side 22a of plate 22. Accordingly, other than the portions 23a and 23b, the rim of electrode 23 is spaced from the four sides of dielectric plate 22. The other plane surface, referred to as a back surface, of dielectric plate 22 is provided with no electrode.

The second type dielectric sheet 17 is also defined by a rectangular dielectric plate 24 having four sides 24a, 24b, 24c and 24d. It is to be noted that plate 24 has the same configuration as that of plate 22. An electrode 25 formed by a film of electric conductive material is deposited on one surface, referred to as a front surface, of dielectric plate 24. Electrode 25 has one extending portion 25a, which extends to the center portion of side 24a of plate 24. Accordingly, other than the portion 25a the rim of electrode 25 is spaced from the four sides of dielectric plate 24. The other plane surface, referred to as a back surface, of dielectric plate 24 is provided with no electrode.

The first and second type dielectric sheets 16 and 17 are held together in a manner indicated by a chain line in FIG. 4 so that extending portion 25a extends in the same direction as extending portions 23a and 23b. Accordingly, a suitable capacitance is obtained between electrodes 23 and 25. It is to be noted that the extending portion 25a is narrower than the space between extending portions 23a and 23b and, therefore, portion 25a is located within the space between portions 23a and 23b. In this manner, a plurality of first and second type dielectric sheets 16 and 17 are held alternately, by a suitable bonding agent or clamping means, such that the front surface of sheet 16 is held in contact with the back surface of sheet 17, and the front surface of sheet 17 is held in contact with the back surface of the next sheet 16. According to the example shown in FIG. 3, there are two first type sheets 16 and two first type sheets 17 held alternately starting with a sheet 17.

Another dielectric sheet 18 having no electrode deposited thereon is held in contact with the last sheet, so that the front surface of the last sheet is covered.

When the sheets 16, 17 and 18 are laminated in the above described manner, a laminated block is defined. According to the preferred embodiment, the laminated block is sintered, thereby turning it to an integrated solid block. An external electrode 19 is provided on one end portion of a side of the laminated block where the extended electrode 23a has its end terminated. Accordingly, external electrode 19 is electrically connected to all the extended electrodes 23a of the laminated sheets. Also, an external electrode 20 is provided on the side of the laminated block where the extended electrode 23b has its end terminated. Accordingly, external electrode 20 is electrically connected to all the extended electrodes 23b. Similarly, an external electrode 21 is provided on the side of the laminated block where the extended electrode 25a has its end terminated. Accordingly, external electrode 21 is electrically connected to all the extended electrodes 25a. Thus, external electrodes 19, 20 and 21 are provided on the same side of the laminated block such that external electrode 21 is positioned between external electrodes 19 and 20 with some spacing between these external electrodes.

When in use, laminated capacitor 15 is mounted on a printed circuit board such that external electrode 19 (or 20) is connected to input, external electrode 20 (or 19) is connected to output, and external electrode 21 is connected to ground. Accordingly, electrodes 23 serve as a part of a transmission line, or hot line, carrying a necessary signal. And, at the same time, external electrode 21 is grounded so that unwanted signals carried on the transmission line are led to ground through a capacitor defined between electrodes 23 and 25.

According to the present invention, since external electrodes 19, 20 and 21 are provided on the same side of the laminated block, the forming of electrodes 19, 20 and 21 can be done by easy and simple steps, resulting in low manufacturing cost. Furthermore, since none of the external electrodes 19, 20 and 21 extends around a corner, there will be no fear of cutting external electrodes. And, at the same time, the residual inductance also becomes small, resulting in the improvement of the capacitor characteristics.

Figure 5:
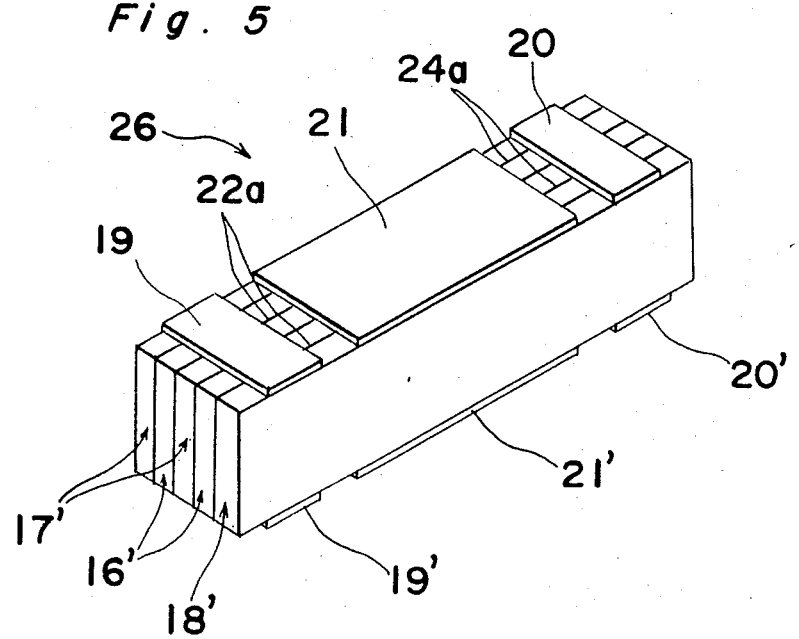
FIG. 5 is a perspective view of a laminated capacitor of a feed-through type according to a second embodiment of the present invention.
Figure 6:
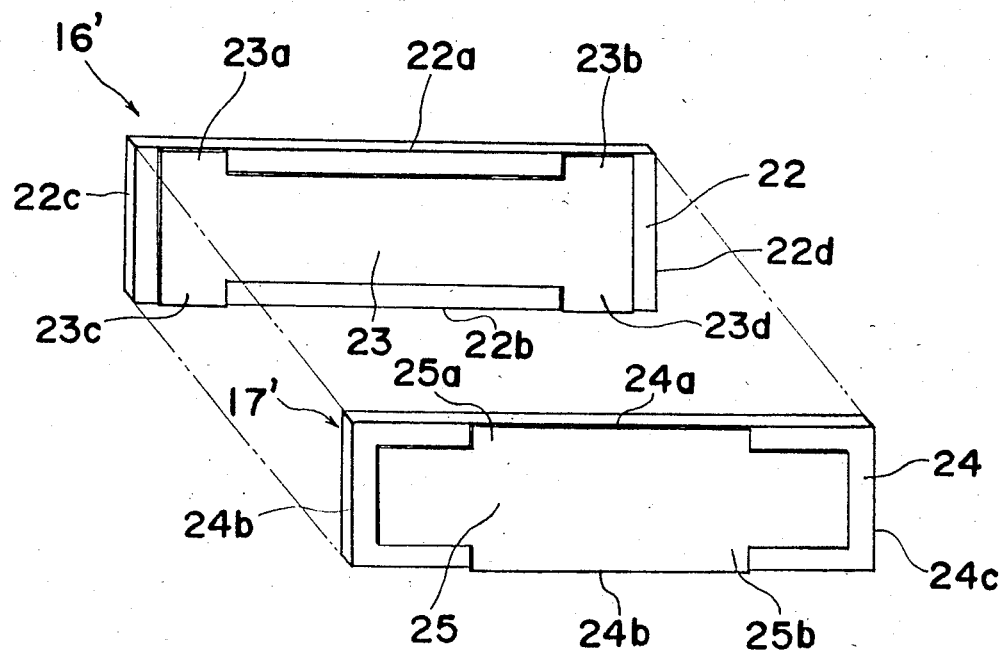
FIG. 6 is a perspective view of certain sheets provided in the capacitor of FIG. 5.

Referring to FIG. 5, a laminated capacitor 26 of a feed-through type according to a second embodiment of the present invention is shown. When compared with the first embodiment, the second embodiment further has similar electrodes 19', 20' and 21' on the surface of the laminated block opposite to the surface provided with electrodes 19, 20 and 21. For this purpose, electrode 23 provided on the first type dielectric sheet 16' has another pair of extending portions 23c and 23c, which extend to opposite end portions of side 22b of plate 22. Similarly, electrode 25 provided on the second type dielectric sheet 17' has another extending portion 25b, which extends to the center portion of side 24b of plate 24.

When a laminated block is formed by putting the sheets 16, 17 and 18 together in the same manner as the first embodiment, an external electrode 19' is provided on one end portion of a side of the laminated block where the extended electrode 23c has its end terminated. Accordingly, external electrode 19' is electrically connected to all the extended electrodes 23c of the laminated sheets. Also, an external electrode 20' is provided on the side of the laminated block where the extended electrode 23d has its end terminated. Accordingly, external electrode 20' is electrically connected to all the extended electrodes 23d. Similarly, an external electrode 21' is provided on the side of the laminated block where the extended electrode 25b has its end terminated. Accordingly, external electrode 21' is electrically connected to all the extended electrodes 25b.

Thus, external electrodes 19', 20' and 21' are provided on the same side of the laminated block such that external electrode 21' is positioned between external electrodes 19' and 20' with some spacing between these external electrodes.

According to the second embodiment, since the external electrodes are provided on the opposite sides of the laminated block, the laminated capacitor 26 can be mounted on a circuit board using either electrodes 19, 20 and 21 or electrodes 19', 20' and 21'. Thus, when mounting the capacitor 26, it is not necessary to consider which side is up and which side is down, resulting in a further simple mounting steps.

According to the present invention, electrodes 19 and 19' can be connected to each other in to form a belt that goes around the laminated block. The same can be said of the other electrodes 21, 21' and electrodes 20, 20'.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A laminated capacitor of a feed-through type for filtering unwanted signals and transmitting wanted signals, comprising:
    a plurality of dielecric sheets laminated one over the other and defining a laminated block having at least a first plane surface where the sides of the laminated sheets are aligned;
    a plurality of center electrodes, each provided between neighboring dielectric sheets such that the rim of the center electrode is spaced from the rim of the sheet;
    first extending electrodes extending from each of every other center electrode and terminating at said first plane surface;
    second extending electrodes extending from each of the same center electrodes as those from which the first extending electrodes extend, and terminating at said first plane surface, said above-mentioned center electrodes, said first extending electrodes, and said second extending electrodes providing a path for such wanted signals;
    third extending electrodes extending from each of the remaining center electrodes and terminating at said first plane surface;
    a first external electrode provided on said first plane surface and electrically connected to said first extending electrodes;
    a second external electrode provided on said first plane surface and electrically connected to said second extending electrodes; and
    a third external electrode provided on said first plane surface and electrically connected to said third extending electrodes.

2. A laminated capacitor as in claim 1, wherein said remaining center electrodes and said third extending electrodes provide a path for such unwanted signals.

3. A laminated capacitor of a feed-through type comprising:
    a plurality of dielectric sheets laminated one over the other defining a laminated block having first and second plane surfaces where the sides of the laminated sheets are aligned;
    a plurality of center electrodes, each provided between neighboring dielectric sheets such that the rim of the center electrode is spaced from the rim of the sheet;
    first extending electrodes extending from each of every other center electrode and terminating at said first plane surface;
    second extending electrodes extending from each of the same center electrodes as those from which the first extending electrodes extend, and terminating at said first plane surface;
    third extending electrodes extending from each of said remaining center electrodes and terminating at said first plane surface;
    a first external electrode provided on said first plane surface and electrically connected to said first extending electrodes;
    a second external electrode provided on said first plane surface and electrically connected to said second extending electrodes;
    a third external electrode provided on said first plane surface and electrically connected to said third extending electrodes,
    fourth extending electrodes extending from each of said every other center electrode and terminating at said second plane surface;
    fifth extending electrodes extending from each of said every other center electrode and terminating at said second plane surface;
    sixth extending electrodes extending from each of said remaining center electrodes and terminating at said second plane surface;
    a fourth external electrode provided on said second plane surface and electrically connected to said fourth extending electrodes;
    a fifth external electrode provided on said second plane surface and electrically connected to said fifth extending electrodes; and
    a sixth external electrode provided on said second plane surface and electrically connected to said sixth extending electrodes.

4. A laminated capacitor of a feed-through type for filtering unwanted signals and transmitting wanted signals, comprising:
    (a) a plurality of first type dielectric sheets, each having
        (i) a center electrode deposited on a first surface thereof, a rim of said center electrode being spaced from a rim of said first type dielectric sheet,
        (ii) a first extending electrode extending from said center electrode and terminating at a particular side of said first type dielectric sheet, and
        (iii) a second extending electrode extending from said center electrode and terminating at said particular side of said first type dielectric sheet in a spaced relationship with said first extending electrode,
        (iv) said above-mentioned center electrode, said first extending electrode, and said second extending electrode providing a path for such wanted signals;
    (b) a plurality of second type dielectric sheets, each having
        (i) a center electrode deposited on a first surface thereof, a rim of said last-mentioned center electrode being spaced from a rim of said second type dielectric sheet, and
  (ii) a third extending electrode extending from said last-mentioned center electrode and terminating at a particuar side of said second type dielectric sheet;
(c) said first and second type dielectric sheets being laminated alternately such that
  (i) a first surface of said first type dielectric sheet confronts a second surface of said second type dielectric sheet and a first surface of said second type dielectric sheet confronts a second surface of said first type dielectric sheet, and
  (ii) such that said particular side of said first type dielectric sheets and said particular side of said second type dielectric sheets are aligned to define a plane surface;

(d) first external electrodes provided on said plane surface and electrically connected to said first extending electrodes;
(e) second external electrodes provided on said plane surface and electrically connected to said second extending electrodes; and
(f) third external electrodes provided on said plane surface and electrically connected to said third extending electrodes.

5. A laminated capacitor as claimed in claim 4, further comprising a third type dielectric sheet laminated on a first surface of one of said alternately laminated dielectric sheets so as to cover the electrode deposited on said dielectric sheet, said third type dielectric sheet forming an end surface of said laminated capacitor.

6. A laminated capacitor as in claim 4, wherein
  said center electrode deposited on a first surface of each of said second type dielectric sheets, and said third extending electrode extending from said last-mentioned center electrode, provide a path for such unwanted signals.

* * * * *